United States Patent [19]

Ordonez

[11] 4,049,316
[45] Sept. 20, 1977

[54] LIFTING MECHANISMS FOR TRUCK BODIES

[76] Inventor: Marino Paneda Ordonez, Ca de Oviedo-Pumarin, Gijon, Spain

[21] Appl. No.: 653,583

[22] Filed: Jan. 29, 1976

[51] Int. Cl.² .............................................. B60P 1/16
[52] U.S. Cl. .................................. 298/22 B; 298/22 P
[58] Field of Search ................. 298/22 B, 22 P, 22 D, 298/22 R

[56] References Cited

U.S. PATENT DOCUMENTS

| 2,593,776 | 4/1952 | Margala | 298/22 B |
| 3,756,442 | 9/1973 | Wagenblast | 298/22 B X |

FOREIGN PATENT DOCUMENTS

| 31,091 | 12/1960 | Finland | 298/22 B |
| 497,247 | 12/1952 | Italy | 298/22 B |

Primary Examiner—Robert J. Spar
Assistant Examiner—George F. Abraham
Attorney, Agent, or Firm—Brady, O'Boyle & Gates

[57] ABSTRACT

A rectangular stabilizing and lifting arm assembly is pivotally connected on one end between a pair of stationary truck frame members and is connected on the outer end by a pair of slide track type connections to oppositely disposed longitudinal members of a dump frame that is pivotally connected to the stationary truck frame members and a hydraulic cylinder assembly pivotally connected on one end to the truck frame members and having the free end of the cylinder rod pivotally connected to the outer free end of the rectangular stabilizing and lifting arm assembly, whereby actuation of the cylinder pivots the latter assembly and the dump frame in an arc from a horizontal position above the truck frame members to a raised dump position.

5 Claims, 9 Drawing Figures

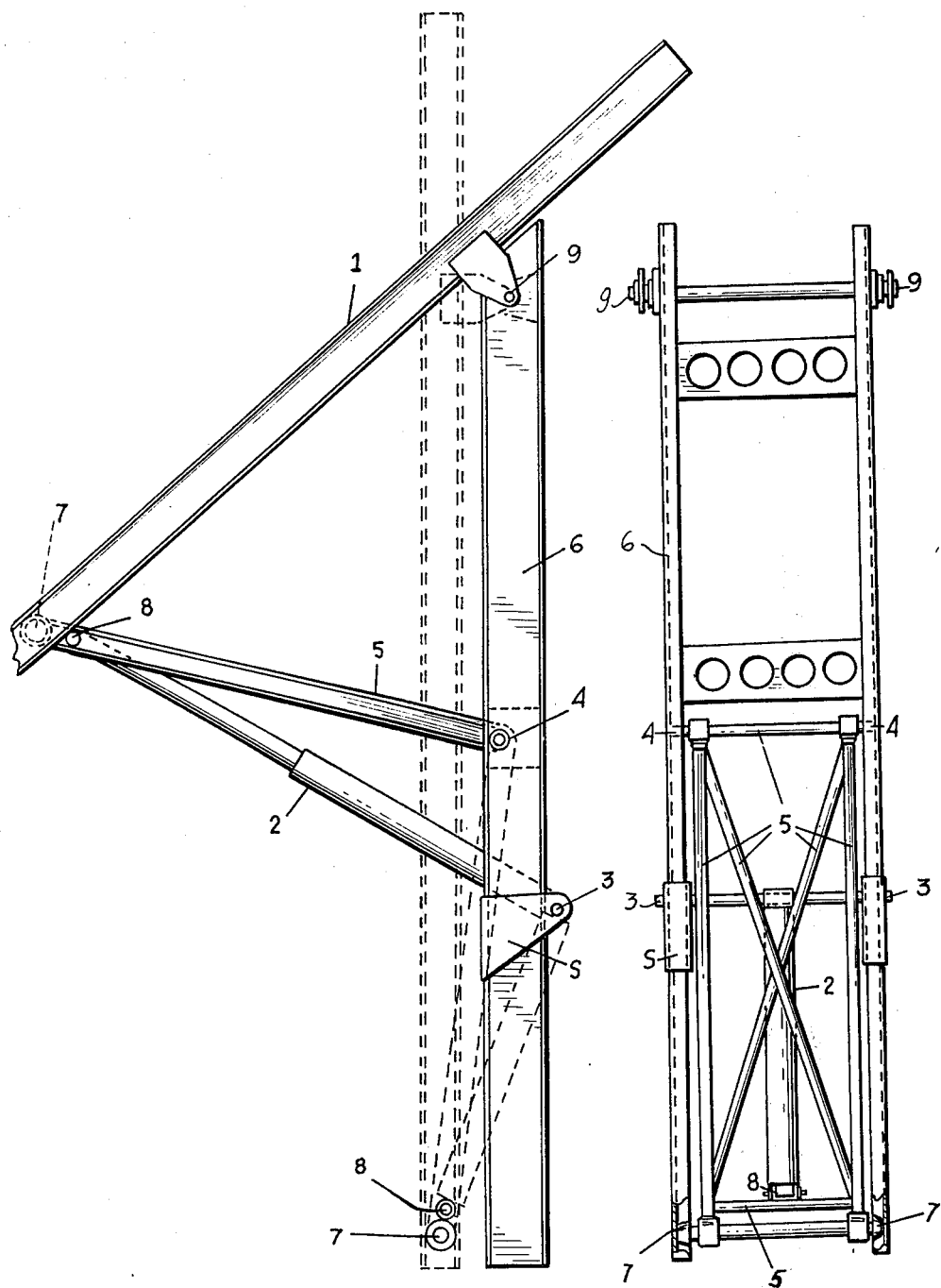

LIFTING MECHANISMS FOR TRUCK BODIES

BACKGROUND OF THE INVENTION

This invention is directed to improvements in hydraulic lifting mechanisms for truck bodies, also referred to as raising and lowering mechanisms for truck bodies, such as dump bodies and the like.

SUMMARY OF THE INVENTION

The mechanism of the present invention is different from the conventional types of lifting mechanisms in that the hydraulic lift cylinder or cylinders are pivotally connected to the truck frame inside or outside of the frame, and the lift cylinder rod is pivotally connected to a stabilizer or lifting arm assembly, connected to raise a truck body, which on being driven by the lift cylinder accompanies the lift cylinder in its travel during the lifting operation.

It is to be understood that the concept overriding the invention enables the mechanism to be mounted in various ways and in different positions on a truck body according to the requirements of each case and the characteristics for applying the same.

This mechanism avoids dumping of the lifted truck body or dump frame to the side, which feature is fulfilled by a stabilizer or lifting arm assembly in the form of a rectangular frame positioned between opposite truck frame members and having two fixed pivot support connections at one end to the opposite truck frame members, so the lifting arm assembly is free to rotate in an upward arc relative to the truck frame from a horizontal stored position between the truck frame members. A dump frame is pivotally connected to the truck frame members and the opposite end of the rectangular frame has two sliding point connections with opposite longitudinal members of the dump frame in the form of rollers on the rectangular frame engaging in slide tracks on opposite sides of the dump frame.

A hydraulic cylinder or a pair of hydraulic cylinders are pivotally connected at one end to the truck frame and the free end of the cylinder rod or rods that reciprocate in the cylinder are pivotally connected to the rectangular frame or lifting arm assembly at a position closely adjacent the outer end thereof and the two sliding point connections. The cylinder rod connection applies actuating force directed to the lifting arm assembly, when the cylinder is actuated by pressurized hydraulic fluid or the like, when the lifting arm assembly is in the lowered rest position and pushes the lifting arm assembly upwardly in a circular arc and pivots the dump frame and any dump body carried thereby upwardly in an arc to a position disposed approximately 60° to the horizontal, or any desired slope as may suit the requirement and characteristics of a particular vehicle. During the extension of the telescopic cylinder in raising the lifting arm assembly in the upwardly progressing arc the cylinder also traces an upwardly progressing arc.

Both the pivot point of the lifting arm assembly as well as the pivot point of the dump frame are variables as to distances and heights between each other, although these two pivot points are fixed and form a triangle with the movable roller connection, which is effectively fastened to the free end of the cylinder rod, from the time the dump frame starts to rise until reaching the optimum height of approximately 60° for unloading. Variation of the distances between these points provides the most efficient and appropriate class of triangle for different types of trucks. Likewise, all of the described mechanism can be mounted independently on a false frame, for placing on a flat bed, which is extremely noteworthy to point out.

Due to the position of the pivot support point of the cylinder on the truck frame, either inside or outside the truck frame, and the draw point or connection of the cylinder rod cylinder rod directly on the stabilizer or lifting arm assembly, it is possible to obtain with a minimum travel of the cylinder rod, a maximum circular arc of relative movement between the truck frame and the dump frame, since from the time that the draw or raising motion starts until it ends, due to the sliding system of the stabilizer or lifting arm assembly, the mechanism is such that the distance between the pivot point of the dump frame and the point of connection of the cylinder rod with the lifting arm assembly will be decreasing, thus providing:

a. a minimum travel of the cylinder;
b. therefore, requiring a smaller cylinder than the size normally required in similar lifting mechanisms;
c. less oil than with conventional lifting mechanisms;
d. less weight than with known types of lifting mechanisms;
e. more rapid raising motion than those known in the prior art.

The mechanism according to the invention also offers the advantage of eliminating torsions on the dump frame and truck frame and thus breakage caused by torsion forces, and it provides easy mounting and therefore saving in labor in connecting it to a truck frame.

These and other advantages of the invention will become apparent to one skilled in the art from the specification hereinafter following by reference to the accompanying drawings which disclose several forms of the mechanism that fall within the scope of the appended claims.

BRIEF DESCRIPTION OF THE DRAWINGS

FIG. 1 is a side elevation view of the mechanism according to the invention;

FIG. 2 is a top plan view of the mechanism shown in FIG. 1;

DESCRIPTION OF THE PREFERRED EMBODIMENTS

Figure 3:
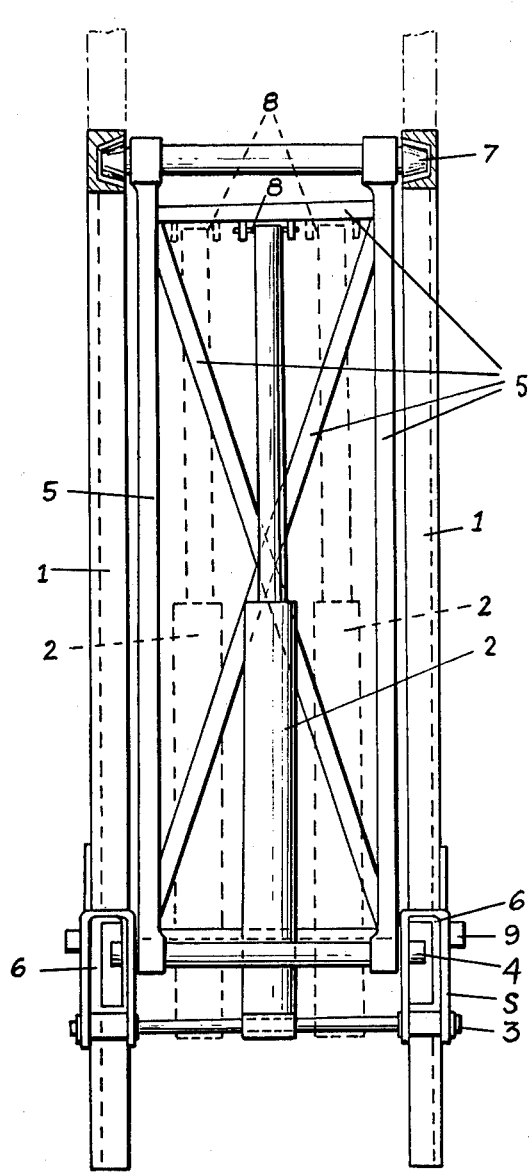
FIG. 3 is an end elevation view of the mechanism in the raised position from the left end of FIG. 1, and showing in phantom lines a modified form using a pair of lift cylinders.

Referring to the drawings in greater detail, reference numeral 6 designates a pair of laterally spaced longitudinally extending frame members, with appropriate cross bracing, which may be the frame members of an existing truck body or members forming a false frame to be placed on top of a flat bed for converting a flat bed truck or the like into a dump body truck. A dump frame 1 or tipping frame, adapted to carry a dump body, dump bed, or the like, is pivotally connected at 9 to the truck frame 6, adjacent the rear end of the truck frame and is adapted to pivot from a horizontal position shown in dotted lines in FIG. 1 overlying the truck frame to a raised position as shown in full lines therein, through an arc of approximately 60°. A stabilizer of lifting arm assembly, indicated generally at 5, in the form of a rectangular frame, as shown in FIGS. 2 and 3, having longitudinal side members with appropriate cross bracing therebetween, is pivotally connected at one end as indicated at 4 between the truck frame members 6. Rectangular frame 5 is provided on its opposite or outer free end with a pair of outwardly extending rollers 7 journalled thereon and extending into rolling engagement with a slide track or channel in the side of the oppositely disposed dump frame members 1. Thus the rectangular frame 5 performs a stabilizing function between the dump frame 1 and members 6 by having a pair of fixed pivot connections at one end to the frames 6 and a stabilizing pair of sliding connections in the form of roller and track engagement connections at the opposite end of frame 5 with the dump frame 1. This four point connection of the frame 5 between the truck frame members 6 and the track or frame members of dump frame 1, in combination with the pair of pivot connections 9 between frames 1 and 6 eliminate torsion forces in the dump frame 1 and in the truck frame 6 and avoids side dumping of the dump frame. At the same time rectangular frame 5 performs the function of a lifting arm assembly for dump frame 1 since it is freely pivotal about pivot connection 4 between a lowered position substantially between the truck frame members 6 as shown in dotted lines in FIG. 1, to a raised position as shown in full lines therein to raise dump frame 1 from the horizontal dotted position to the raised dump position as shown in full lines.

A lift cylinder 2 is pivotally connected about a fixed pivot axis 3 extending laterally between truck body frame members 6 and connected thereto by reinforcing plates S. The outer free end of the rod of the piston that reciprocates within the cylinder is pivotally connected at 8 to the outer end of lifting arm frame assembly 5, closely adjacent the outer end of the frame and closely adjacent to the axis of rotation of the rollers 7 on the end of the frame. In the retracted position of cylinder 2, as shown in dotted lines in FIG. 1, the lifting arm assembly is in its lowered position between the frame members 6 and 1 and the dump frame 1 is in a horizontal position overlying truck frame members 6. As cylinder 2 is pressurized with hydraulic fluid or the like, the cylinder rod connection at 8 immediately begins to push upwardly on frame 5 and the cylinder and frame 5 simultaneously rotate along arcuate paths about their respective pivot connections 3 and 4 with frame members 6 in clockwise directions, and due to the slide or movable connection at 7 of the frame 5 with dump frame 1, the dump frame simultaneously pivot in an arcuate path in a clockwise direction about pivot point 9. During the raising motion of dump frame 1 the axis 7 of the rollers or the slide connection and the cylinder rod pivot connection at 8 arcuately move toward the pivot connection 9 of the dump frame to reduce the distance between these points.

Cylinder 2 may be a double-acting cylinder and can be arranged such that when hydraulic pressure is reduced or relieved in the cylinder the weight of dump frame 1 causes the cylinder rod to retract into the cylinder and the dump frame to return to the horizontal stored position shown in dotted lines in FIG. 1.

Figure 4A:
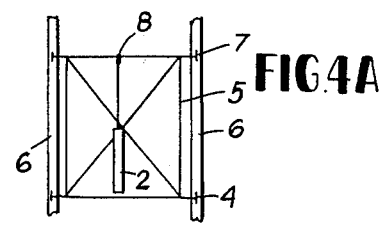
FIG. 4A is a schematic diagram of the lift mechanism shown in FIGS. 1–3.
Figure 4B:
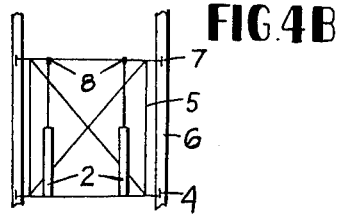
FIG. 4B is a schematic diagram of the modified form of the mechanism shown in phantom lines in FIG. 3.

A modified form of the structure is shown in FIGS. 3 and 4B wherein a pair of lift cylinders 2 are pivotally connected to members 6 along axis 3, rather than a single cylinder, and are pivotally connected at 8 adjacent the outer end of frame 5. In this form of the invention the two cylinders are connected between the opposite truck frame members 6 and inwardly of the sides of frame 5, generally in the same manner as in the form of the invention utilizing a single cylinder 2. However, as indicated in another modified form of the invention as illustrated in FIG. 4C the pair of cylinders 2 may be disposed outwardly of truck frame members 6, in which case the pivot connections 8 of the cylinder rod to the frame 5 are also outwardly of frame members 6 and the slide connections at 7 may either be on the outer side surfaces of the dump frame members or on the inner side surfaces by the rollers being connected through an offset to the outer free end of frame 5.

Figure 4C:
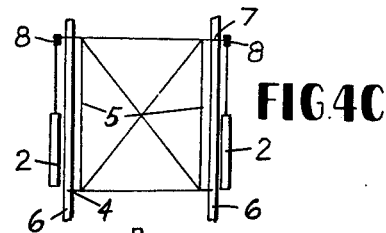
FIG. 4C is a schematic diagram of a modified form of the mechanism shown in FIG. 4B.
Figure 4D:
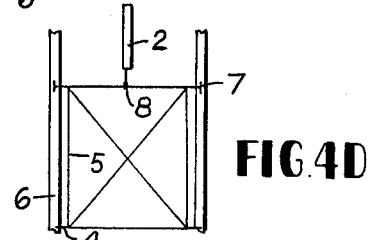
FIGS. 4D – 4F are schematic diagrams of modified forms of the mechanism shown respectively in FIGS. 4A – 4C.
Figure 4E:
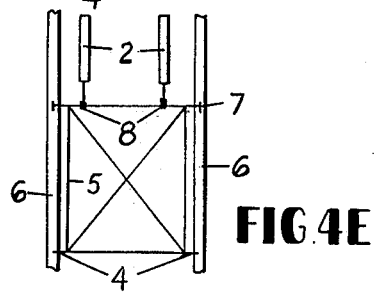
Figure 4F:
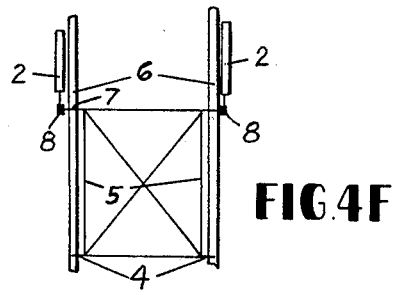

FIGS. 4D, 4E and 4F respectively show modified forms, in schematic form, of the forms of the mechanism shown respectively in FIGS. 4A, 4B and 4C, where the only difference is that the hydraulic cylinder or cylinders 2 are connected so their pivot connection 3 to the stationary frame 6 instead of being under frame 5 and inwardly of point 7 and 8 as shown in FIG. 1, is outwardly of frame 5 in the longitudinal direction so that it is on the opposite side of points 7 and 8 from pivot connection 4 of frame 5. These latter three arrangements are available depending upon what is suitable for the particular type truck on which the mechanism is to be used and the tonnage which is to be lifted by the dump frame 1.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A lifting mechanism for truck bodies and the like in combination with a pair of laterally spaced longitudinal stationary frame members, a dump frame including a pair of laterally spaced longitudinal track members pivotally connected to said stationary frame members adjacent one end thereof, said longitudinal track members disposed in a plane immediately above and parallel to the plane of said longitudinal stationary frame members, a rectangular frame stabilizer assembly positioned between and spanning substantially the entire lateral distance between said stationary frame members, an X-brace on said rectangular frame stabilizer assembly and extending the length thereof, a pair of pivot connections connecting the opposite sides of the inner end of said rectangular frame stabilizer assembly to a medial portion of said pair of laterally spaced stationary frame members, a pair of connectors on the opposite sides of the outer end of said rectangular frame stabilizer assembly engaged for sliding movement in said pair of laterally spaced longitudinal track members, the said opposite end of the rectangular frame stabilizer assembly spanning substantially the entire lateral distance between said longitudinal track members, at least one extensible lift cylinder pivotally connected at one end between and in the plane of said stationary frame members and pivotally connected at the opposite end to the outer end of said rectangular frame stabilizer assembly in the plane of the longitudinal track members in the lowered position, said lift cylinder positioned beneath said X-brace of said rectangular frame in the lowered position, whereby upon extension of said extensible lift cylinder said dump frame is moved about its pivot connection with said stationary frame members from a horizontal position to a raised dump position.

2. A lifting mechanism as set forth in claim 1 in which said pair of connectors on the outer end of said stabilizer assembly comprise a pair of rollers, said pair of track members each having a lifting flange thereon, and said rollers connected in rolling engagement with said lifting flanges.

3. A lifting mechanism as set forth in claim 1 in which said pair of connectors on the outer end of said stabilizer assembly are connected on a first lateral axis, and said extensible lift cylinder pivotally connected to the outer end of said stabilizer assembly along a second lateral axis closely adjacent to said first lateral axis.

4. A lifting mechanism as set forth in claim 1 in which the pivot connection of said lift cylinder to said stationary frame members is located on said stationary frame members on the opposite side of said pivot connections for said stabilizer from said pivot connection for said dump frame.

5. A lifting mechanism as set forth in claim 1 in which the pivot connection of said lift cylinder and the pivot connections for said stabilizer to said stationary frame members are located closely adjacent each other.

* * * * *